United States Patent [19]

Carrell

[11] Patent Number: 4,690,283

[45] Date of Patent: Sep. 1, 1987

[54] PARCEL SORTING APPARATUS

[75] Inventor: Ross M. Carrell, Burlington County, N.J.

[73] Assignee: RCA Corporation, Princeton, N.J.

[21] Appl. No.: 813,571

[22] Filed: Dec. 26, 1985

[51] Int. Cl.[4] .......................... B07C 5/36; B65G 43/08

[52] U.S. Cl. ...................................... 209/549; 193/23; 198/463.3; 209/583; 209/698; 209/706; 209/942; 414/276; 414/639

[58] Field of Search ............... 209/546, 549, 551, 552, 209/563, 564, 569, 583, 584, 586, 655, 698, 702, 703, 705, 706, 707, 900, 942; 198/370, 463.3, 468.6; 414/134, 136, 267, 270, 273, 276, 283, 422, 639, 593, 281, 641, 642, 672; 364/478; 193/2 R, 2 D, 8, 23

[56] References Cited

U.S. PATENT DOCUMENTS

| | | | |
|---|---|---|---|
| 1,126,977 | 2/1915 | Gargam et al. | 193/8 |
| 1,446,693 | 2/1923 | Churchill | 209/703 |
| 1,856,165 | 5/1932 | Marchand et al. | 414/134 |
| 2,386,520 | 10/1945 | Watson et al. | 414/134 X |
| 2,624,470 | 1/1953 | Geist | 414/281 X |
| 3,302,804 | 2/1967 | Harris | 414/134 X |
| 3,486,640 | 12/1969 | Lemelson | 414/273 X |
| 3,550,772 | 12/1970 | Melvin | 209/705 |
| 3,759,381 | 9/1973 | Mercadie et al. | 209/900 X |
| 3,802,557 | 4/1974 | Brandt . | |
| 3,880,298 | 4/1975 | Habegger et al. | 414/134 |
| 3,905,896 | 9/1975 | Jackson et al. | 209/704 |
| 4,067,459 | 1/1978 | Rozengauz et al. | 414/134 X |
| 4,407,415 | 10/1983 | Bohme et al. | 209/586 X |

FOREIGN PATENT DOCUMENTS

| | | | |
|---|---|---|---|
| 0165993 | 11/1953 | Australia | 414/642 |
| 0415054 | 6/1925 | Fed. Rep. of Germany | 209/702 |
| 0455202 | 10/1936 | United Kingdom | 209/702 |

*Primary Examiner*—Robert B. Reeves
*Assistant Examiner*—Edward M. Wacyra
*Attorney, Agent, or Firm*—Joseph S. Tripoli; Christopher L. Maginniss

[57] ABSTRACT

A parcel sorting and distributing apparatus includes a plurality of inclined chutes which receive parcels at their open upper ends. Each parcel slides down a chute into a receptacle such as a mail hamper. The chutes are vertically stacked and arranged in a spoke-like fashion about a circle with the aggregate of their upper ends forming a cylindrical surface. A rotatable vertical mast at the axis of the cylinder includes a pivotally mounted carrier. In one position the carrier retains a parcel; when it pivots to a second position, the parcel spills out into one of the chutes. A first motor causes the mast to rotate and a second motor drives the carrier vertically along the mast. A parcel which has been identified as to its destination is loaded into the carrier, and a controller controls the first motor, the second motor and the carrier pivot so as to convey the parcel to the appropriate receptacle. Sensors are disclosed for, inter alia, preventing an oversize parcel from entering the system, ensuring that each parcel entering the system drops into one of the receptacles, and gauging the approximate volume of each parcel so as to estimate when each receptacle is full.

18 Claims, 5 Drawing Figures

PARCEL SORTING APPARATUS

The United States Government has rights in this invention pursuant to Contract No. 104230-84-D-0929 awarded by the United States Postal Service.

This invention relates generally to article handling systems and, more particularly, to an apparatus for sorting parcels and distributing them to a multiplicity of destinations in accordance with the sorting.

BACKGROUND OF THE INVENTION

In the handling of small parcels, as, for example, by the United States Postal Service (USPS), it is a standard practice for a human operator to stand amid an array of hampers, illustratively, cloth bags hung from frames, read the addressee information, and throw each individual parcel into a hamper marked for the parcel's destination. The number of hampers in the array is limited to about twenty. More than that would require floor space beyond the reach of a normal person's ability to throw with accuracy. The use of smaller hampers would permit a greater number to be provided within reasonable reach, but would fill up more quickly and have to be replaced more often.

Because there are typically many more destinations than can be accommodated by only twenty hampers, multiple sortings are necessary when using this process, and each parcel must be handled several times before it has found its ultimate destination hamper. Furthermore, the operator must be familiar with the relative position of each destination hamper at each level of the sorting process, in order to maintain even a modicum of efficiency.

The introduction of automation into this field has brought about improvements in the accuracy and speed by which small parcels are sorted and distributed. U.S. Pat. No. 3,759,381, issued Sept. 18, 1973, to M. Mercadie et al., discloses a sorting apparatus in which parcels are loaded into carriers on a moving conveyor system. Each carrier is coded with destination information in an associated memory device, and the memory data is used to cause the carrier to be unloaded at an appropriate one of a plurality of receiving stations. The Mercadie et al. apparatus is relativey complex and requires a large amount of floor space in order to provide access to a useful number of hampers.

U.S. Pat. No. 3,905,896, issued Sept. 16, 1975, to H. L. Jackson et al., discloses a mail sorting and distributing apparatus. The apparatus comprises a multi-tier carousel-like unit that rotates about a vertically-disposed axis. The carousel unit has a number of pigeonholes opening radially outward from a central core; within each pigeonhole is a removable bin. One or more operators, positioned adjacent the continually rotating unit, sort mail by placing it in the appropriate bin as it passes. The bins illustrated in the disclosure are relatively small and thus would appear suited only for flat mail, such as letters and magazines. In order for the Jackon et al. apparatus to handle parcel mail, the bins would have to be larger or they would have to be emptied quite frequently.

The Jackson et al. apparatus is limited in the number of sorting bins which may be used for this purpose. Its number of tiers is limited by the reach of a human operator. Its capacity may be expanded by enlarging the carousel, thereby increasing the number of pigeonholes along its circumference. However, increasing the carousel diameter would extend the operator's average waiting time for a particular pigeonhole to come within reach, assuming a constant velocity at the outer edge of the carousel. There is, therefore, a practical upper limit in the number of storage bins which the Jackson et al. apparatus will accommodate.

SUMMARY OF THE INVENTION

In accordance with the principles of the present invention, an apparatus is disclosed for sorting articles and for distributing them into receptacles. The apparatus comprises a plurality of inclined chutes which are open at their upper and lower ends. The chutes are arranged so that the aggregate of their upper ends forms a generally cylindrical surface and their lower ends are disposed outwardly of the cylinder forming radiating rows of openings. Each one of a plurality of receptacles is positioned adjacent the lower end of a respective one of the chutes, such that an article exiting the lower end of one of the chutes will drop into one of the receptacles. The apparatus also comprises a rotatable mast having a longitudinal central axis aligned substantially with the axis of the cylinder, and a carrier on the mast. The apparatus additionally comprises carrier motion means for producing motion of the carrier between a first position and a second position, the first position being such that the carrier retains an article therein, the second position of the carrier causing an article carried therein to spill radially outward of the central axis of the mast into the upper end of one of the chutes. Loading means are provided for loading articles into the carrier when the carrier is in the first position. The apparatus further comprises mast motion means for producing rotary motion of the mast about its central axis and elevating means for elevating and lowering the carrier on the mast. Finally, the apparatus comprises control means for controlling the carrier motor means, the mast motion means and the elevating means so that an article which has been loaded into the carrier by the loading means may be conveyed to a predetermined one of the plurality of receptacles.

DETAILED DESCRIPTION OF THE PREFERRED EMBODIMENT

Figure 1:
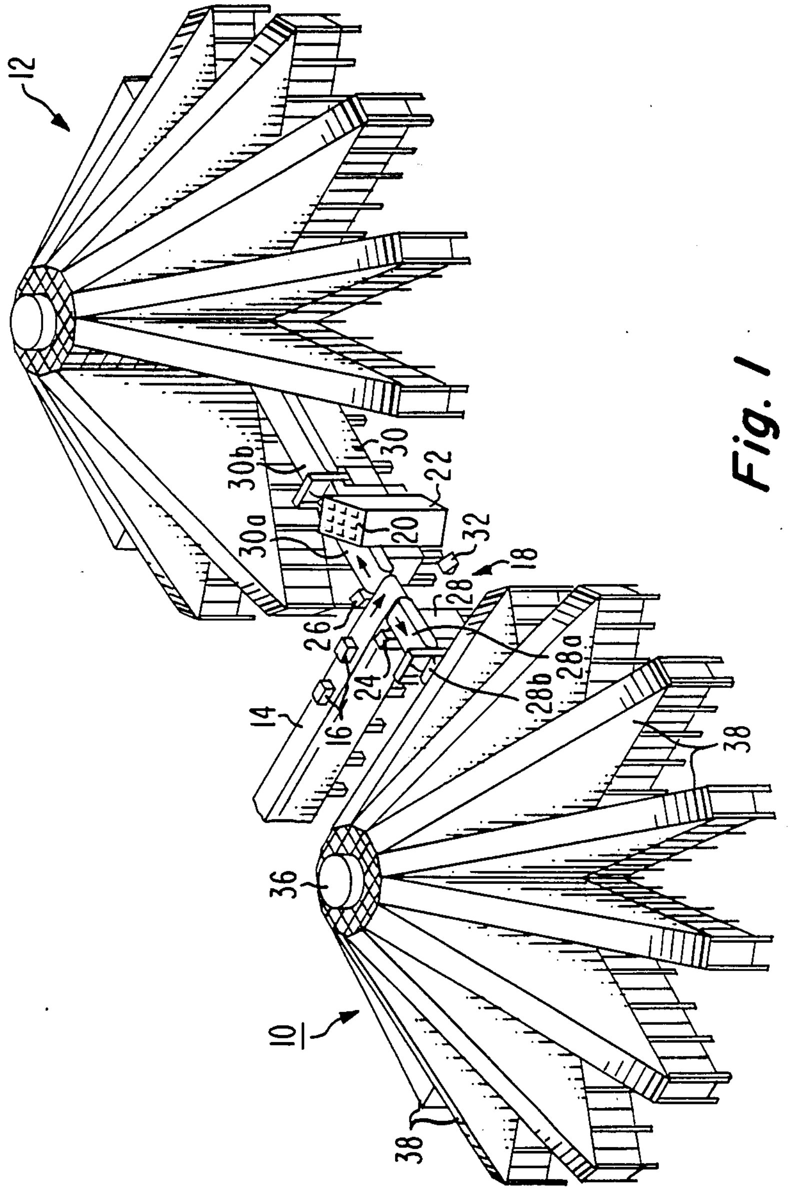
FIG. 1 illustrates the system of the preferred embodiment in a perspective view.

Referring to FIG. 1, there is shown a parcel sorting system according to the preferred embodiment of the present invention. The system includes an incoming conveyor 14 for bringing small mail parcels, shown illustratively as parcels 16, to an operator's work station 18, and two distribution stations 10 and 12. Although two distribution stations are shown in this embodiment, the present invention is also intended to include systems with only one as well as systems with three or more distribution stations, the number being determined by the volume of small parcel mail to be handled by the available floor space.

As will be seen from the detailed description which follows, the parcel sorting system of the present invention receives a parcel at work station 18 along incoming conveyor 14. An operator positioned at work station 18 locates the destination code on the parcel, typically a zip code, keys the code into console keyboard 20 located on cabinet 22, and, in the case of a system including multiple distribution stations, responds to indicators 24 and 26 which direct the operator to place the parcel onto one of the take away conveyors 28 or 30. Assuming that the parcel is placed on conveyor 28, it enters distribution station 10 at a loading station, where it is received into a tray coupled to a centeral vertical mast. The tray is elevated and rotated into correspondence with the opening of a particular one of a plurality of downwardly-inclined chutes. The tray is then tipped such that it dumps the parcel into the chute, where it slides down and drops into a receptacle, typically a mail container, positioned below the chute. Each receptacle and its corresponding chute opening are identifiable, so that the destination code determines the proper chute into which each parcel is to be dispensed in order to arrive at the correct receptacle for that destination.

The parcel sorting system of the present invention is controlled by a process controller which coordinates the actions of a plurality of conveyors, motors, indicators and sensors, such that the coding information keyed by the operator into console keyboard 20 determines the appropriate receptacle into which the parcel is delivered.

Figure 3:
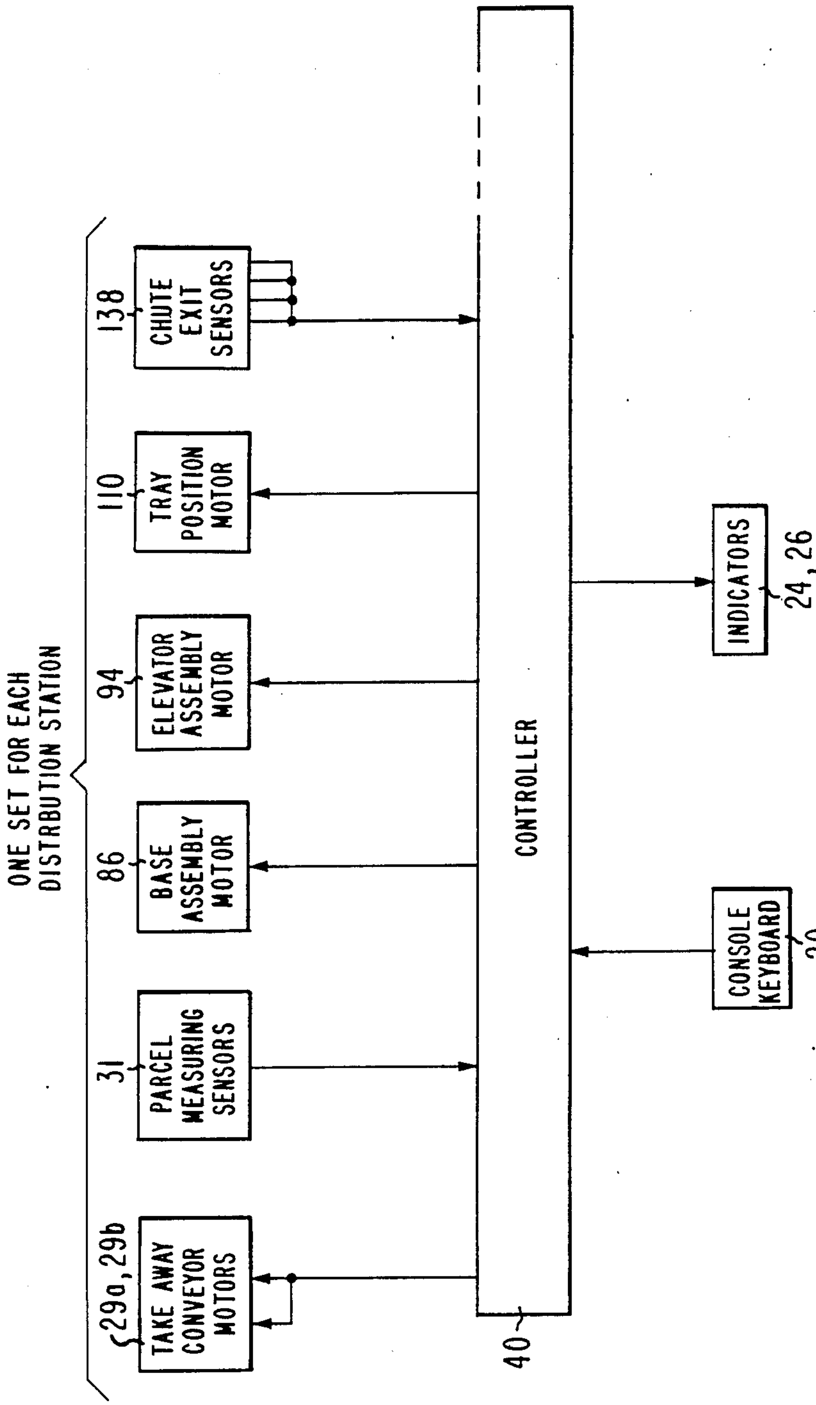
FIG. 3 is a block diagram representation useful in understanding the electrical signal interconnections of the FIG. 1 embodiment.

Referring to the parcel conveying portion of the FIG. 1 embodiment, incoming conveyor 14 and take away conveyors 28 and 30 are of conventional design, typically endless belts driven by geared or friction means coupled to their inside surfaces so as to move parcels on their upper surfaces in the directions shown by the arrows in the drawing. Movement of incoming conveyor 14 may be controlled by the operator via footswitch 32 coupled to conveyor drive means (not shown). Take away conveyors 28 and 30 each comprise, in the preferred embodiment, a pair of end-to-end conveyor belts 28*a,* 28*b* and 30*a,* 30*b,* respectively. Each pair of belts 28*a,* 28*b* and 30*a,* 30*b* are sufficiently closely spaced that parcels travel uninterruptedly from one of the pair to the other. By way of example, belts 28*a,* 28*b* are driven by motors 29*a,* 29*b* under the control of controller 40, as shown in FIG. 3. Conveyors 14, 28 and 30 may typically be 16 inches (41 cm) in width and, in the preferred embodiment which is more fully quantified in later paragraphs, conveyors 28 and 30 are approximately 10 feet (3 meters) in length.

At work station 18, the operator manually picks up a parcel, observes the zip code, and keys that code into console keyboard 20. As may been seen in FIG. 3, keyboard 20 is coupled to controller 40, which may typically be located within cabinet 22. In the present example, controller 40 is a stored-program microprocessor having a resident program for inter alia controlling the operation of the moving components of the parcel sorting system as well as performing housekeeping, monitoring and indicating functions. Controller 40 responds to the information keyed into console keyborad 20 by determining the appropriate destination receptacle for that code information and, as an initial process, actuating either indicator 24 or 26 to advise the operator of the proper take away conveyor 28 or 30 for the parcel. Indicators 24, 26 may typically be lamps having backlighted legends uniquely indicative of each take away conveyor 28, 30.

For optimum parcel handling capability in the present system, the operator places parcels on take away conveyors 28, 30, oriented with their longest dimensions longitudinally along the belt.

Figure 2:
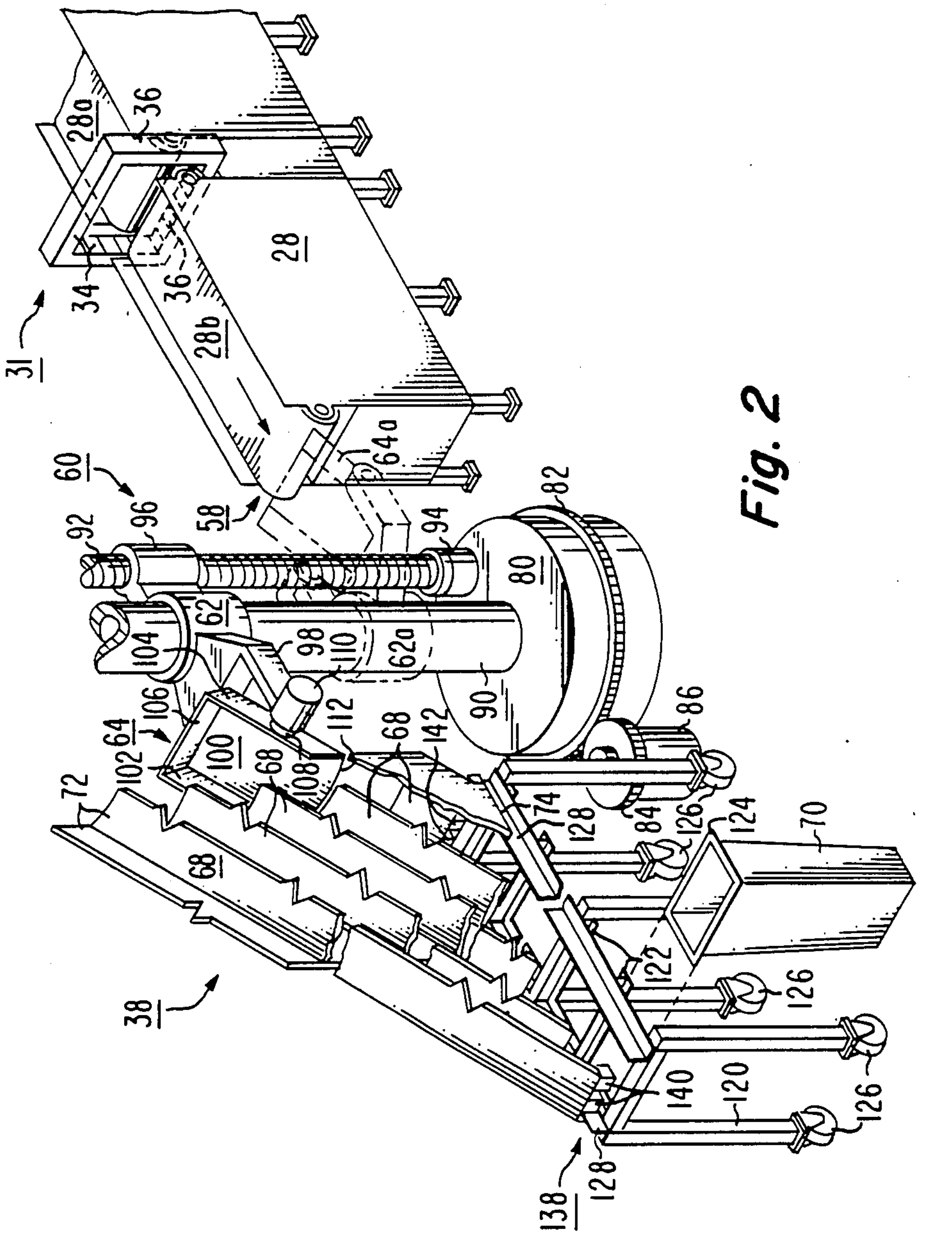
FIG. 2 is a partially cutaway view of one distribution station according to the FIG. 1 embodiment.

Referring now to FIG. 2, and, in particular, to take away conveyor 28, there are a plurality of sensors 31 for measuring the profile of the parcel located at the junction of the two conveyor belts 28*a* and 28*b.* Sensors 31 may typically include a plurality of light sources 34, such as light emitting diodes (LED's), directed toward a corresponding plurality of light detectors 36, such as photodiodes. They are disposed horizontally and vertically about conveyor 28 such that a parcel traversing take away conveyor 28 between belt 28*a* and belt 28*b* interrupts specific ones of the light paths between sources 34 and detectors 36.

As may be seen in FIG. 3, the output signals from detectors 36 are coupled to controller 40 which determines therefrom the parcel cross-sectional area in the plane normal to the direction of movement. In addition, by measuring the time duration of the interruption, and knowing the velocity of movement of conveyor belts 28*a* and 28*b,* controller 40 can determine the length of a parcel and, thus, its approximate volume. This information can be used in two ways: first, if the measuring process determines the parcel to be oversized in any dimension, such that it would not fit into particular elements of distribution station 10, specifically, a tray, chute or receptacle, which elements will be described in more detail in later paragraphs, the parcel can be ejected from the system, either manually or by automated means. Second, by knowing the approximate volume of a parcel and its destination receptacle, controller 40 can totalize the volume of parcels in each receptacle and, when a predetermined volume is met or exceeded, provide a "full" indication corresponding to a particular receptacle, which signifies to an operator that the receptacle is to be replaced.

Considering now the distribution station portion of the preferred embodiment, as shown in FIG. 2, the major elements are a mast assembly 60 including elevator assembly 62 and tray 64, a plurality of inclined chutes 68, and a plurality of receptacles 70. (For ease of understanding of the invention, FIG. 2 includes only one receptacle 70 and a small number of chutes 68.)

Mast assembly 60 includes a lower base assembly 80 having a toothed circumferential portion 82 which is engagably coupled with gear 84. Gear 84 is rotationally driven by motor 86, which may be a stopper motor, such that actuation of motor 86 results in rotation of lower base assembly 80, which rotation may be continuous and may be provided in either direction. Alternatively, motor 86 may be implemented as a closed-loop servo motor. As may be seen in FIG. 3, motor 86 is responsive to control signals generated from controller 40 for determining its actuation and its direction of rotation.

Mast assembly 60 further includes a support mast 90 and an elevator assembly 62 slidably mounted on support mast 90. The longitudinal axis of support mast 90 is substantially coincident with the rotational axis of lower base assembly 80, such that support mast 90 rotates substantially about its axis.

Threaded shaft 92 extends upwardly from lower base assembly 80, parallel to and adjacent support mast 90. Threaded shaft 92 is driven to rotate about its central axis by motor 94, on lower base assembly 80, such that shaft 92 may function as a lead screw. Elevator assembly 62 includes an internally-threaded sleeve 96 which engages threaded shaft 92 such that rotation of shaft 92 causes vertical movement of elevator assembly 62 along support mast 90 and shaft 92. Rotation by motor 94 in a first direction provides upward movement of elevator assembly 62; rotation of motor 94 in the opposite direction provides downward movement of assembly 62. As may be seen in FIG. 3, motor 94 is responsive to control signals generated by controller 40 for determining its actuation and its direction of rotation.

In the preferred embodiment, mast assembly 60 may be a modular cylindrical robot of a type similar to Model M-1, manufactured by GMF Robotics, Troy, Mich., which incorporates the lead screw form of vertical lift for elevator assembly 62. Alternatively, mast assembly 60 may include a cable hoist or an hydraulic form of vertical lift drive.

Coupled to elevator assembly 62 is a tray 64, which is a bin-like structure having a base 100, two side walls 102 and 104, and a rear wall 106. Tray 64 is pivotably coupled to yoke 98 of elevator assembly 62 at pivot point 108, where motor 110, responsive to a control signal generated by controller 40, as shown in FIG. 3, drives tray 64 between a first position, in which tray 64 is tilted back such that its slightly-convex front lip 112 is elevated above the rest of base 100, and a second position, in which tray 64 is tilted forward such that its contents pour out over lip 112. Motor 110 drives tray 64 into its first position when elevator assembly 62 is positioned at loading station 58 (shown in phantom as tray 64*a* and elevator assembly 62*a* in FIG. 2), such that a parcel, dropping off the edge of belt 28*b*, will be retained by tray 64*a*.

Distribution station 10 additionally includes a plurality of inclined chutes 68 arranged in spoke-like fashion about mast assembly 60. Although for ease of understanding, FIG. 2 depicts only one spoke set 38 of chutes 68 and receptacles 70, distribution station 10 typically includes eleven spokes 38, spaced about mast assembly 60 at increments of approximately 30 degrees. The twelfth spoke position is taken by incoming conveyor 28 and loading station 58.

Within each spoke set 38 are a plurality of chutes 68, illustratively seven, stacked vertically, such that their slightly-concave open upper ends 72 form a substantially cylindrical surface with support mast 90 positioned at the central axis of the cylinder. The open lower ends 74 of the chutes 68 forms a plane substantially normal to the axis of the cylinder. Thus, in the stack of chutes 68 comprising a spoke set 38, the lowest chute is the shortest and the uppermost chute is the longest. Chutes 68 are fabricated of a relatively low-friction material, such as stainless steel or polished aluminum, and are steeply inclined, illustratively at approximately 45 degrees, such that parcels slide easily and quickly down the chute 68. It may be desirable to provide the floor surfaces of the upper chutes 68 with a material to provide some friction, so that parcels do not acquire a damaging momentum on their way to receptacles 70.

As may be seen in FIG. 1, a support member 36 is connected to the upper ends of the uppermost chutes in each spoke set 38 for enhanced support. In addition, support member 36 may include bearing surfaces to aid in the support of the upper ends of support mast 90 and threaded shaft 92.

A plurality of receptacles 70 are positioned adjacent the lower end 74 of each of the plurality of chutes 68, in position to receive therein parcels sliding down and exiting the chutes 68. In the present example, receptacles 70 are, illustratively, semi-rigid plastic containers similar to the type used as kitchen wastebaskets. Each of the receptacles 70 associated with a spoke set 38 of chutes 68 is mounted on a frame assembly 120. Assembly 120 maintains receptacles 70 in proper relative position by the use of guide rails 122 which position receptacles 70 and support them at their upper flanged surfaces 124. Frame assembly 120 includes casters 126 so that the spoke set 38 of receptacles 70 can be wheeled radially out from distribution station 10 when it becomes necessary to replace one or more receptacles 70 which have become full. Frame assembly 120 is maintained in proper position relative to the lower ends 74 of chutes 68 by guide rails 128 on both sides of frame assembly 120. Rails 128 guide frame assembly 120 between the side walls at the lower ends 74 of chutes 68.

It may be seen from the arrangement of the spoke sets 38 in FIG. 1, that the outer receptacles 70, positioned remote from mast assembly 60, may be individually removed without moving frame assembly 120. In order to replace the inner receptacles 70, however, it is necessary to move assembly 120 radially outward. It would be advantageous to arrange a distribution pattern such that the inner receptacles fill more slowly, and need be removed only at the end of a sorting run.

Within each spoke set 38 of chutes 68, at the plane formed by the lower ends 74 of the chutes 68, there is a sensor 138 for detecting the momentary presence of each parcel as it exits any one of the chutes 68 and drops into a receptacle 70. The sensor 138 may typically comprise one or more light sources 140, such as LED's directed toward one or more corresponding light detectors 142, such as photodiodes. Sensor 138 is arranged such that a dropping parcel interrupts the light path between sources 140 and detector 142. As may be seen in FIG. 3, the sensor output signal is coupled to controller 40 so as to confirm to that device the completion of the distribution cycle for each individual parcel.

Figure 4A:
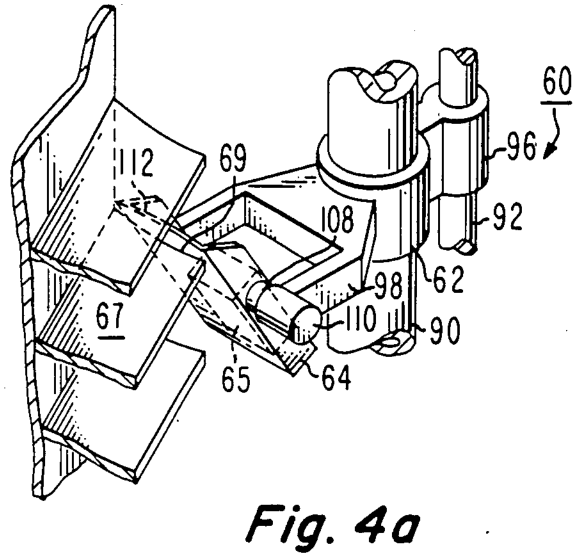
FIGS. 4*a* and 4*b* illustrate the motions of the tray of the FIG. 1 between its loading and emptying positions.
Figure 4B:
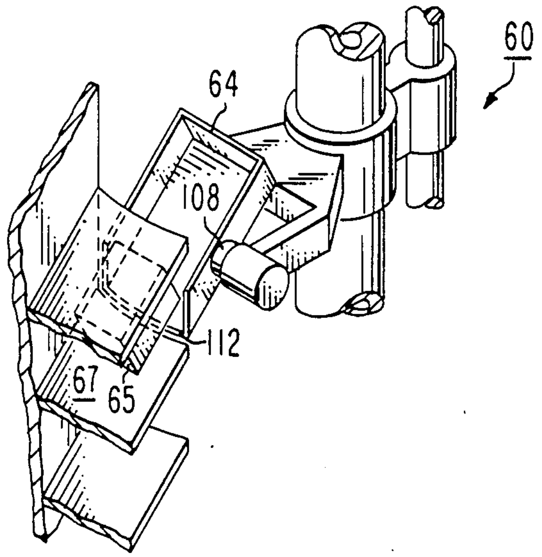

Referring to FIGS. 4*a* and 4*b*, there is shown in detail the coordinated movements of tray 64 between its retaining position (FIG. 4*a*) and its unloading position (FIG. 4*b*). FIG. 4*a* shows tray 64 including parcel 65 having been positioned adjacent chute 67. In this position, tray 64 has its front lip 112 located just above the bottom surface of chute 67 at its entrance 69.

At this time there is a coordination of movements between tray 64 vis-a-vis its pivot point 108 and the vertical position of elevator assembly 62 vis-a-vis lead screw 92. As tray 64 is tipped forward about pivot point 108 via drive motor 110, elevator assembly 62 is also elevated along lead screw 92 such that the front lip 112 of tray 64 maintains essentially the same vertical position relative to the bottom surface at the entrance 69 to chute 67.

Referring now to FIG. 4*b*, tray 64 is in its unloading position with its front lip 112 forming an extension of chute 67, and parcel 65 is shown sliding out of tray 64 and down chute 67. With parcel 64 gone, tray 64 is repositioned to its retaining position (as in FIG. 4*a*) by rotation about pivot point 108, and elevator assembly 62 is returned by rotation about support mast 90 and lowering by threaded shaft 92 to loading station 58.

In a typical parcel sorting system of the type shown in FIG. 1, having two distribution stations, each distribution station may include eleven spokes, wherein each spoke set 38 may typically include seven chutes feeding seven receptacles. Thus, the entire system as shown includes the capability of sorting for 154 destinations in a single process, which is the equivalent of approximately nine "toss-in-the-hamper" processes of the type described earlier as the current USPS practice.

In the preferred embodiment, tray 64 has a width of 16 inches (41 cm), a depth of 24 inches (61 cm), and a height of 7 inches (18 cm). These dimensions will accommodate approximately 99 percent of all mail classified as irregular parcels and pieces. The chutes 68 have a width of 16 inches (41 cm) and a height of 7 inches (18 cm), and are inclined at an angle of approximately 45 degrees. The hampers have an opening of 10 inches (25 cm) by 16 inches (41 cm) and are approximately 3 feet (91 cm) deep; hence, the plane formed by the open lower ends of the chutes 68 must be somewhat more than 3 feet above the floor in order to accommodate frame assembly 120 thereunder. The aggregate of the upper ends 72 of the chutes 68 form a cylinder which has a diameter of 6 feet (1.83 m).

Using the typical values from the preceding paragraphs, it is seen that a parcel sorting system which accommodates 154 destination baskets will fit onto a floor space of approximately 46 feet (14 m) by 18 feet (5.5 m), and requirea height of approximately 10 feet (3 m). It may be assumed that the average cycle time for the processes performed within distribution station 10, that is, the time to load a parcel into tray 64, dump the parcel into its proper chute 68, and return tray 64 to the loading station 58, is between three and four seconds. Thus, the system of FIG. 1, working at full capacity may be capable of sorting between 1800 and 2400 parcels per hour.

Means may be provided within distribution station 10 for indicating to controller 40 that a receptacle-supporting frame assembly 120 has been removed. Such signaling means might include a light source/light detector combination, or a switch assembly, configured in a manner well understood by those skilled in the art. In such a circumstance, the parcel sorting system may continue to operate so long as no parcel enters the system destined for a receptacle which has been temporarily removed.

Means may also be provided for quickly identifying the destination associated with each receptacle at each chute opening. One method is to provide a bar code label on each receptacle and on an adjacent surface at the lower end of each chute. When the receptacle is moved into position under a chute, the codes on the two labels are read, typically by a wand reader. Portable readers which store coded numbers internally, or which transmit them by radio, are well known devices which are commercially available. The code numbers are transferred to the system controller so that destination codes keyed into the system by an operator at the console will cause the parcels to be conveyed to the correct receptacle.

While previous paragraphs have indicated that the illustrative system provides receptacles for 154 destinations, in actual practice it may be found that some destination codes receive a considerbly greater volume of parcels than others. In such a case, it would be an obvious extension of the present invention to provide more than one chute/receptacle combination for such high-volume destinations.

While the principles of the present invention have been demonstrated with particular regard to the illustrated structure of the figures, it will be recognized that various departures from such illustrative structure may be undertaken in practice of the invention. The scope of the invention is not intended to be limited to the structure disclosed herein but should instead be gauged by the breadth of the claims which follow.

What is claimed is:

1. An apparatus for sorting and distributing articles, said apparatus comprising:
   - an array of inclined chute sets, each chute set comprising
   - a plurality of inclined chutes, open at their upper and lower ends, said chutes arranged so that the aggregate of their upper ends forms a generally cylindrical surface having a substantially vertical central axis and their lower ends are disposed outwardly of said cylindrical surface forming radially spaced rows of axially directed openings;
   - a plurality of of receptacles, each one positioned adjacent the lower end of a respective one of said chutes, such that an article exiting the lower end of one of said chutes will drop into one of said receptacles;
   - a rotatable mast having a longitudinal central axis aligned substantially with the central axis of said cylindrical surface;
   - a carrier on said mast;
   - carrier motion means for producing pivotal motion of said carrier between a first position and a second position, said first position being such that said carrier retains an article therein, said second position of said carrier causing an article carried therein to spill radially outward of said central axis of said mast into the upper end of one of said chutes;
   - loading means for loading said articles into said carrier when said carrier is in said first position;
   - mast motion means for producing rotary motion of said mast about its central axis;
   - elevating means for elevating and lowering said carrier on said mast; and
   - control means for controlling said carrier motion means, said mast motion means and said elevating means, so that an article which has been loaded into said carrier by said loading means may be conveyed to a predetermined one of said plurality of receptacles.

2. The apparatus according to claim 1 wherein said mast motion means includes a stepper motor.

3. The apparatus according to claim 1 wherein said mast motion includes a closed-loop servo motor.

4. The apparatus according to claim 1 further including sensor means for sensing when articles exit said chutes.

5. The apparatus according to claim 4 wherein said sensor means includes a photodetector and a light source providing a light beam directed toward said photodetector, said light source and said photodetector spaced apart from one another such that an article exiting one of said chutes interrupts said light beam.

6. The apparatus according to claim 1 further including means for measuring the approximate volume of said articles.

7. The apparatus according to claim 6 wherein said volume measuring means includes sensor means and computing means responsive to said sensor means, said sensor means including a plurality of light sources providing light beams respectively toward a plurality of photodetectors such that an article at said loading means interrupts said light beams from reaching said plurality of photodetectors.

8. The apparatus according to claim 7 wherein said computing means includes means for computing the volume of articles received in each of said receptacles.

9. The apparatus according to claim 1 wherein said elevating means includes an internally-threaded sleeve on said carrier and a threaded shaft engaging said sleeve, said threaded shaft having a longitudinal axis substantially parallel to said central axis of said mast, said threaded shaft being selectively rotatable about its longitudinal axis.

10. A system for sorting and distributing articles, said articles having destination information thereon, said system comprising:

means for conveying said articles to a work station;

a plurality of distribution stations; and means at said work station responsive to said destination information for selectively conveying said articles to said distribution stations, wherein each of said distribution stations comprises:

an array of inclined chute sets, each chute set comprising a plurality of inclined chutes, open at their upper and lower ends, said chutes arranged so that the aggregate of their upper ends forms a generally cylindrical surface having a substantially vertical central axis and their lower ends are disposed outwardly of said cylindrical surface forming radially spaced rows of axially directed openings;

a plurality of receptacles, each one positioned adjacent the lower end of a respective one of said chutes, such that an article exiting the lower end of one of said chutes will drop into one of said receptacles;

a rotatable mast having a longitudinal central axis aligned substantially with the central axis of said cylindrical surface;

a carrier on said mast;

carrier motion means for producing pivotal motion of said carrier between a first position and a second position, said first position being such that said carrier retains an article therein, said second position of said carrier causing an article carried therein to spill radially outward of said central axis of said mast into the upper end of one of said chutes;

loading means for loading said articles into said carrier when said carrier is in said first position;

mast motion means for producing rotary motion of said mast about its central axis;

elevating means for elevating and lowering said carrier on said mast; and control means for controlling said carrier motion means, said mast motion means and said elevating means, so that an article which has been loaded into said carrier by said loading means may be conveyed to a predetermined one of said plurality of receptacles.

11. The system according to claim 10 further including sensor means for sensing when articles exit said chutes.

12. The sytem according to claim 11 wherein said sensor means includes a photodetector and a light source providing a light beam directed toward said photodetector, said light source and said photodetector spaced apart from one another such that an article exiting one of said chutes interrupts said light beam.

13. The system according to claim 10 further including means for measuring the approximate volume of said articles.

14. The system according to claim 13 wherein said volume measuring means includes second means and computing means responsive to said sensor means, said sensor means including a plurality of light sources providing light beams respectively toward a plurality of photodetectors such that an article at said loading means interrupts said light beams from reaching said plurality of photodetectors.

15. The system according to claim 14 wherein said computing means includes means for computing the volume of articles received in each of said receptacles.

16. The system according to claim 10 wherein said elevating means includes an internally-threaded sleeve on said carrier and a threaded shaft engaging said sleeve, said threaded shaft having a longitudinal axis substantially parallel to said central axis of said mast, said threaded shaft being selectively rotatable about its longitudinal axis.

17. The system according to claim 10 wherein said means for selectively conveying said articles to said distribution stations includes indicator means uniquely indicative of said distribution stations.

18. The system according to claim 10 wherein said plurality of distribution stations includes two distribution stations.

* * * * *

UNITED STATES PATENT AND TRADEMARK OFFICE
CERTIFICATE OF CORRECTION

PATENT NO. : 4,690,283

DATED : September 1, 1987

INVENTOR(S) : Ross Michael Carrell

It is certified that error appears in the above-identified patent and that said Letters Patent is hereby corrected as shown below:

Col. 3, line 13, change "centeral" to --central--.

Col. 10, line 26, delete "second" and insert --sensor--.

Signed and Sealed this

Twelfth Day of January, 1988

*Attest:*

DONALD J. QUIGG

*Attesting Officer*

*Commissioner of Patents and Trademarks*